United States Patent
Kaneko

(10) Patent No.: US 9,298,451 B2
(45) Date of Patent: Mar. 29, 2016

(54) NON-TRANSITORY COMPUTER-READABLE RECORDING MEDIUM STORING APPLICATION DEVELOPMENT SUPPORT PROGRAM AND APPLICATION DEVELOPMENT SUPPORT SYSTEM THAT AUTOMATICALLY SUPPORT PLATFORM VERSION

(71) Applicant: Kyocera Document Solutions Inc., Osaka (JP)

(72) Inventor: Kotaro Kaneko, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/633,154

(22) Filed: Feb. 27, 2015

(65) Prior Publication Data

US 2015/0242205 A1   Aug. 27, 2015

(30) Foreign Application Priority Data

Feb. 27, 2014  (JP) .................................. 2014-036604

(51) Int. Cl.
*G06F 9/44*  (2006.01)

(52) U.S. Cl.
CPC ......................... *G06F 8/71* (2013.01)

(58) Field of Classification Search
USPC ................... 717/120–122, 105–109
IPC ......................... G06F 8/60,8/65, 8/71
See application file for complete search history.

(56) References Cited

U.S. PATENT DOCUMENTS

| | | | | |
|---|---|---|---|---|
| 7,133,874 | B2* | 11/2006 | Hill et al. | |
| 7,194,730 | B2* | 3/2007 | Pramberger | G06F 8/71 717/120 |
| 7,454,744 | B2* | 11/2008 | Bhogal | G06F 8/73 717/122 |
| 7,454,745 | B2* | 11/2008 | Aridor | G06F 8/71 707/999.202 |
| 7,516,442 | B2* | 4/2009 | Wu et al. | 717/120 |
| 7,562,346 | B2* | 7/2009 | Jhanwar et al. | 717/120 |
| 7,607,126 | B2* | 10/2009 | Read | 717/172 |
| 7,735,062 | B2* | 6/2010 | de Seabra e Melo | G06F 9/4443 707/616 |
| 7,761,851 | B2* | 7/2010 | Bailey et al. | 717/121 |

(Continued)

FOREIGN PATENT DOCUMENTS

JP   H10-269065 A   10/1998

OTHER PUBLICATIONS

Feiler, "Software Process Support Through Software Configuration Management", IEEE, pp. 58-60, 1990.*

(Continued)

*Primary Examiner* — Anil Khatri
(74) *Attorney, Agent, or Firm* — James W. Judge

(57) ABSTRACT

In an application development support system, a file extractor searches platforms for target files supporting the version of an application developer's project, identifying any library not common to the platform but necessary to the project version. Based on manifest files, an interface reference unit queries open-source application programming interfaces for any libraries remaining as not having been extracted by the file extractor, such library files being version-dependent interface difference files for the project build. A manifest file creation unit generates manifest files for the difference files found by the interface reference unit, and merges the difference files with existing manifest files, replacing only the version-dependent portions required by the target platform.

3 Claims, 2 Drawing Sheets

(56) References Cited

U.S. PATENT DOCUMENTS

| | | | | |
|---|---|---|---|---|
| 8,015,546 B2* | 9/2011 | Jones | ............... | G06F 8/34 715/762 |
| 8,024,703 B2* | 9/2011 | Gerken | ............... | G06F 8/30 717/104 |
| 8,060,871 B2* | 11/2011 | Bernabeu-Auban et al. | . | 717/174 |
| 8,122,434 B2* | 2/2012 | Kostadinov | ............... | G06B 19/0426 700/86 |
| 8,276,121 B2* | 9/2012 | Miller | ............... | G06F 8/71 717/120 |
| 8,418,131 B2* | 4/2013 | Emmelmann | ............... | G06F 8/315 709/217 |
| 8,554,732 B2* | 10/2013 | Clark et al. | ............... | 707/638 |
| 8,561,015 B2* | 10/2013 | Rowan | ............... | G06F 8/20 717/105 |
| 8,660,871 B2* | 2/2014 | Vianello | ............... | 705/7.11 |
| 8,667,465 B2* | 3/2014 | Poole | ............... | G06F 8/71 717/120 |
| 8,671,392 B2* | 3/2014 | Jahr | ............... | G06F 8/60 717/101 |
| 8,856,734 B2* | 10/2014 | Thyagarajan et al. | ............... | 717/107 |

OTHER PUBLICATIONS

Le et al, "Patch Verification via Multiversion Interprocedural Control Flow Graphs", ACM, pp. 1047-1058, 2014.*

Nguyen et al, "An Infrastructure for Development of Object-Oriented, Multilevel Configuration Management Services", ACM, pp. 215-224, 2005.*

Yoon et al, "Effective and Scalable Software Compatibility Testing", ACM, pp. 63-73, 2008.*

Townend et al, "Building Dependable Software for Critical Applications: Multi-Version Software versus One Good Version", IEEE, pp. 103-110, 2001.*

Kelly et al, "Techniques for Building Dependable Distributed Systems: Multi-version Software Testing", IEEE, pp. 400-407, 1990.*

\* cited by examiner

NON-TRANSITORY COMPUTER-READABLE RECORDING MEDIUM STORING APPLICATION DEVELOPMENT SUPPORT PROGRAM AND APPLICATION DEVELOPMENT SUPPORT SYSTEM THAT AUTOMATICALLY SUPPORT PLATFORM VERSION

INCORPORATION BY REFERENCE

This application is based upon, and claims the benefit of priority from, corresponding Japanese Patent Application No. 2014-036604 filed in the Japan Patent Office on Feb. 27, 2014, the entire contents of which are incorporated herein by reference.

BACKGROUND

Unless otherwise indicated herein, the description in this section is not prior art to the claims in this application and is not admitted to be prior art by inclusion in this section.

Application creation necessitates a development environment. Use of the development environment creates an application as a target. The application as the target is configured and managed in a unit referred to as a project.

The project is closely related to a version of the development environment. The version of the development environment is closely related to a version of a platform of an operating system (OS) where the application is operated.

Files or libraries required for the application are different depending on the platforms. When a developer attempts to develop the application for various versions of the platform, each of the projects are often modified for each of the versions of the platforms.

Under this circumstance, various kinds of techniques for supporting developers have been proposed. For example, for a library management method in a development environment and an execution environment of software, there is provided a technique of a library management method especially for adding, changing, and deleting rules regarding a library structure.

SUMMARY

An application development support system according to an aspect of the disclosure is for creating an application by building build resources that contain libraries and manifest files. The application development support system includes a project version confirmation circuit, an updating circuit, and a manifest file creation circuit. The project version confirmation circuit searches all projects existing in a resources holding region to confirm the version in situations where a platform of an operation target for the application is in a plurality of versions. The updating circuit updates version-dependent files by replacing files that differ by version, stored in a development environment, with files appropriate to the project version. The manifest file creation circuit creates manifest files for what is different from an open-source interface, and merging the files with existing manifest files.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
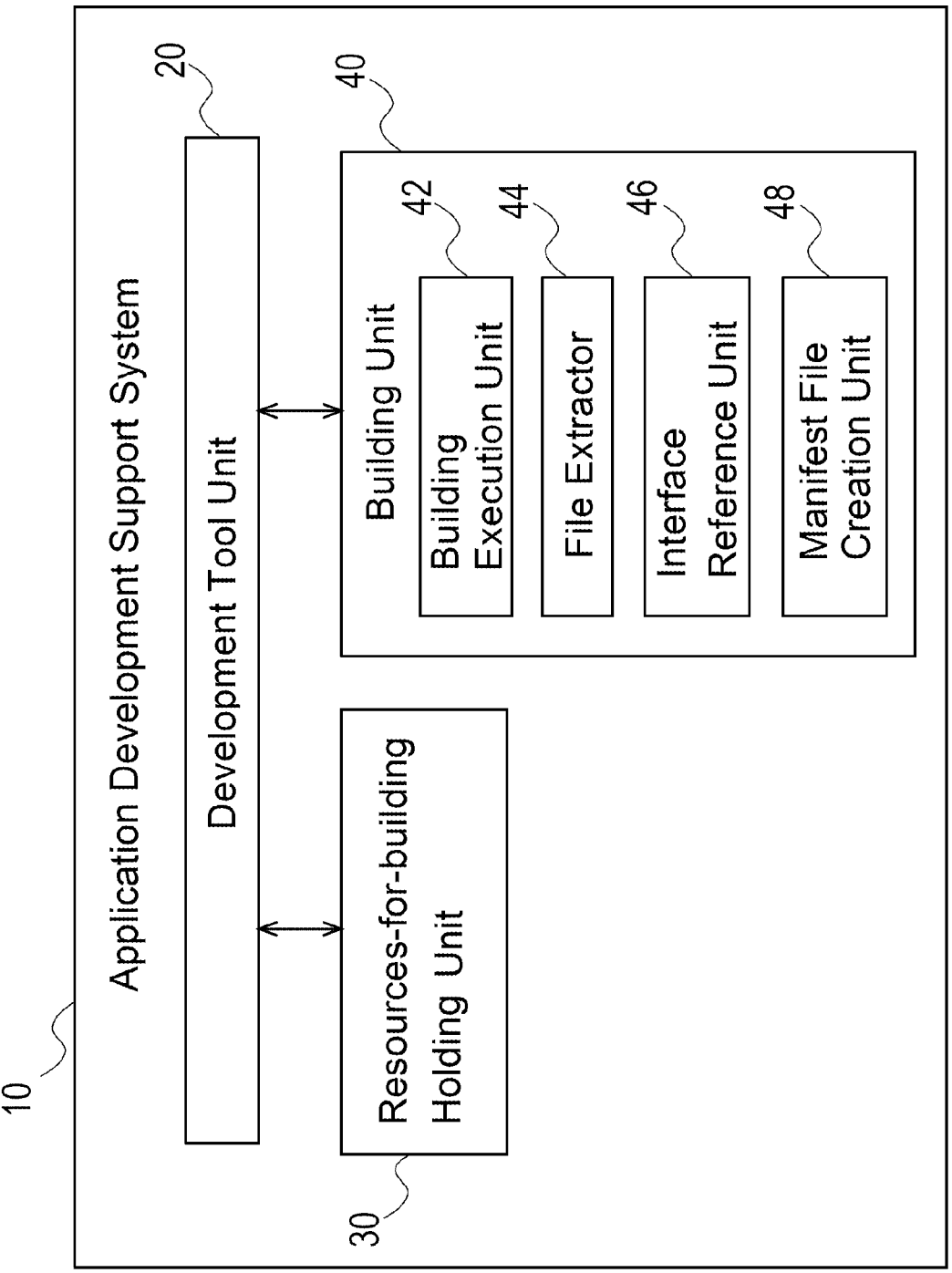
FIG. 1 is a schematic diagram illustrating a functional block configuration of an application development support system of an embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes an embodiment of the disclosure with reference to the drawings.

FIG. 1 a schematic diagram illustrating a functional block configuration of an application development support system 10 as an application development environment according to the one embodiment. The application development support system 10 is achieved as a program executed by a computer having an arithmetic device and a storage device on a software basis, and by the computer and peripherals (display apparatus, input/output device) that have a control circuit executing the programs on a hardware basis.

The application development support system 10 includes a development tool unit 20, a resources-for-building holding unit 30, and a building unit 40 that are achieved by operations of the control circuit.

The development tool unit 20, which is software providing an application development environment, provides an integrated environment for supporting designing, coding, debugging, and testing the application using so-called Graphical User Interface (GUI). The development tool unit 20 controls development environments for the application to be created in units referred to as "Project." Specifically, when creating application, a user uses the development tool unit 20 to define a project and edit a source code in the defined project. The project is constituted with files, libraries, and folders, and components of the project are stored in the folders.

The resources-for-building holding unit 30 holds various files, libraries, and similar matter required when building the application to be created in the project.

The building unit 40 uses the files, libraries, and similar matter held in the resources-for-building holding unit 30 to execute building to create desired application. The building herein means generating execution codes for the application based on the files in the resources-for-building holding unit 30. Generally, it is a processing including steps such as compile and link.

The building unit 40 includes a building execution unit 42, a file extractor 44, an interface reference unit 46, and a manifest file creation unit 48.

The building execution unit 42 is a program tool that actually builds application according to the resources-for-building holding unit 30 such as a compiler.

When a platform of an operating system (OS) is present in a plurality version, the file extractor 44 extracts libraries commonly required for all of these platforms. The extracting herein means an action of searching all the platforms, and arranging the library commonly required for all the platforms to the necessary locations for the project. This does not especially limit the location of the arrangement insofar as the path for the link upon building is open. Furthermore, "library commonly required" is the common file in versions of all the platforms. This common file is fixed.

Following the extraction processing of the libraries commonly required, the file extractor 44 performs processing of searching the platform to be the target, that is, the file supporting the version of the project. It is necessary to distinct the files and the libraries for searching; however, an extension may be used for distinction. In this processing, the file extractor 44 identifies the libraries that are not common but in necessity.

The interface reference unit 46 performs processing of querying the open interfaces for the remaining libraries that have not been extracted. Querying the open interface is a process in order that other applications search an Application Programming Interface (API) available by the other applications on the libraries. A process of querying the open interface, which is stated in order to determine which API the application for the building uses or not use, is dynamically created. The files, which have described information on querying the open interface, are manifest files, and are necessary in the development environment when building.

The manifest file creation unit 48 generates manifest files for difference searched by the interface reference unit 46, and merges the files with the existing manifest files.

Figure 2:
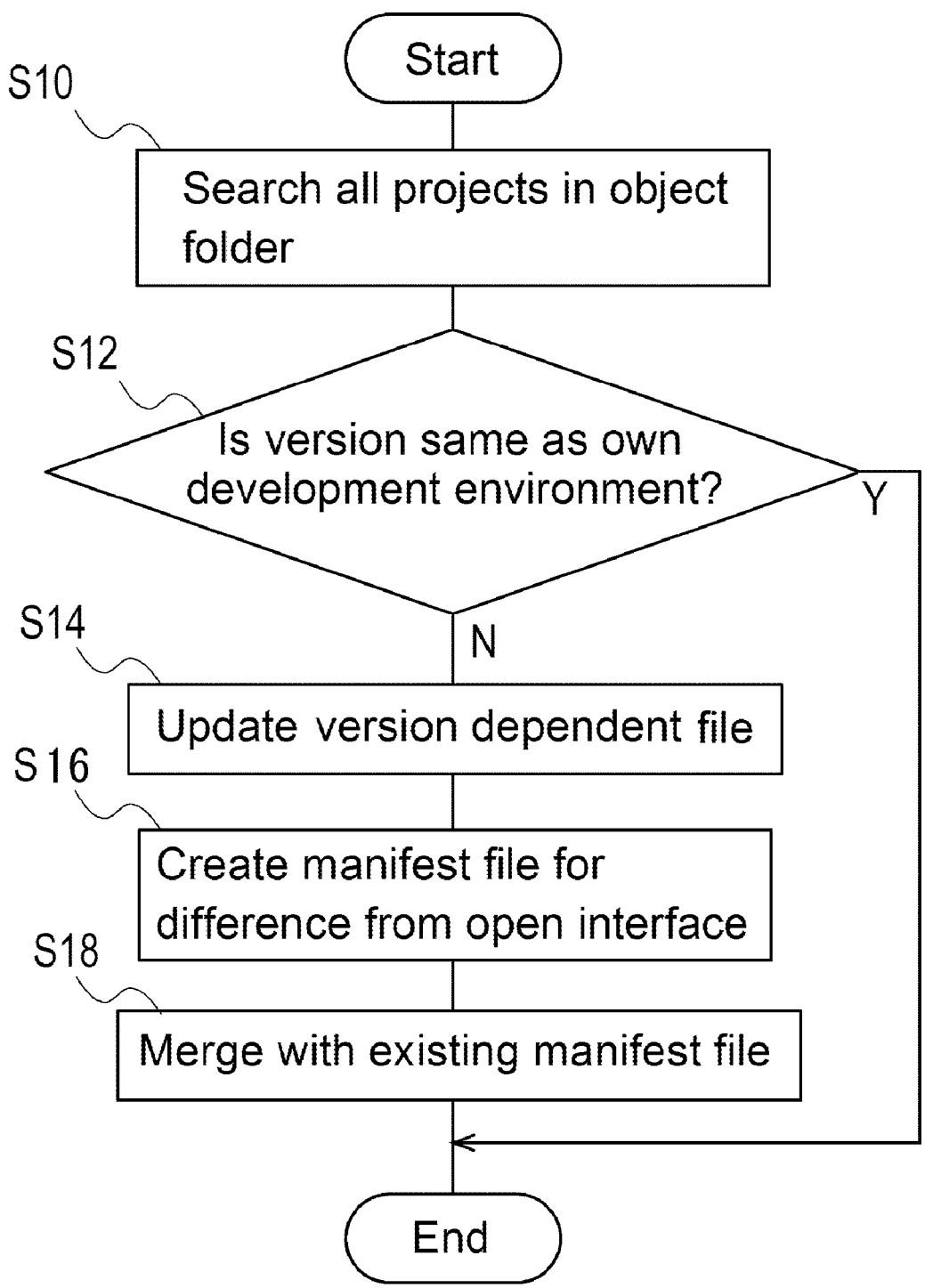
FIG. 2 is a flowchart of an updating process of a project by the application development support system.

The processing by the above-described configuration will be described. FIG. 2 is a flowchart illustrating a project update processing by the application development support system 10.

When the user initiates the development environment, the user operates the development tool unit 20 and displays GUI for development on the display apparatus to start processing the creation of the application. First, the file extractor 44 refers to the resources-for-building holding unit 30, searches all the projects existing in the object folders, and confirms the version (Step S10). Specifically, the file extractor 44 searches all the projects existing in the object folders, and lists up the target platform versions of the all projects. It should be noted that the target platform version is a version of the platform to be the target (for example, OS) when the project is built to create the application. Thus, the file extractor 44 functions as a project version confirmation unit.

The file extractor 44 determines whether or not the searched project is the same version as a version of the own environment (Step S12). When they are the same version (Yes in Step S12), it is not necessary to update the project, thus the processing for the update is terminated.

When they are different versions (N in Step S12), the file extractor 44 updates the version dependent files, and performs processing of replacing the files that are different per version stored in the development environment, for example, the libraries (Step S14). Naturally, the development environment holds the version dependent files of the own platform version. Thus, the file extractor 44 also functions as an updating unit.

Next, the manifest file creation unit 48 creates manifest files for difference from the open interface (Step S16), and merges these files with the existing manifest files (Step S18). Specifically, the manifest file creation unit 48 creates the manifest file for difference searched by the interface reference unit 46, and merges these files with the existing manifest files.

The application uses APIs of the platforms where the application operates. Relatively numerous platforms are required to describe which APIs (or API groups) are published and which APIs (or API groups) are used among them on the manifest files. For example, it includes an OSGi environment or similar environment used for an embedded system. In this case, the manifest file created by the project creators includes a portion where the project creators have described and a portion which is required by the platforms in one file. No simple replacement is accordingly available. As described above therefore, creating the manifest file for difference from the open interface, and merging this file with the existing manifest files will replace only the version depending portions required by the platforms.

As described, the application development support system 10 of the embodiment supports the target platforms of the development environment automatically when a plurality of the projects with various platforms to be the target exists. According to the result, a table associating the platforms with the projects will be unnecessary. The conventional application development environment often manages the table, which associates the files, libraries, manifest files and the platform version, selects the version when building the application, and specifies the necessary libraries to build. This is one factor by which the development environment becomes bloated, and complicated. However, for the application development support system 10 of the embodiment, switching a version of a platform, which is a target, is not performed by the selection method, and the application development support system 10 includes the own version file only.

Particularly, the versions of the platforms are so often updated in open source OS such as Android (registered trademark) used in portable terminal, for example, and Linux (registered trademark) used in image forming apparatus, for example, that it is very effective to use the application development support system 10 of the embodiment. It is advantageous in that no special resources and processing capacity are unnecessary and other existing functions are rarely affected. Furthermore, the application development support system 10 of the embodiment is effective, for instance, to generate application relating to an image forming apparatus such as a printer, and a MFP. In other words, some of the printer and the MFP are often used for a longer period than personal computers and portable terminals, and thus require to support many versions of OSes. In this respect, for the application of the image forming apparatus, use of the application development support system 10 of the embodiment ensures the facilitated creation of the application supporting various platforms.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A non-transitory computer-readable recording medium storing an application development support program, the application development support program causing a computer to function as:

a development tool circuit for i) providing an application development environment being an integrated environment for supporting designing, coding, debugging, and testing of applications using a graphical user interface (GUI), and for ii) controlling the application development environment such as to be created in units of projects, the projects including files, libraries, and folders, with components of the projects being stored in the folders, the development tool circuit being used, in creating of applications, for defining a project and editing source code in the defined project;

a resources-for-building holding circuit that includes the files and the libraries required when building an application to be created in a project; and a building circuit using the files and the libraries in the resources-for-building holding circuit to execute a build for creating an application, the build including i) generating of execution codes for the application based on the files in the resources-for-building holding circuit, and ii) processing including compile and link steps, and the building circuit including a building execution circuit for building an application based on the resources-for-building holding circuit, a file extractor for i) extracting the libraries required in common for all platforms including a plurality of versions in an operating system, for ii) arranging the searched libraries required in common for all the platforms into necessary locations for a project, for iii) searching the platform supporting the version of a project, and for iv) identifying libraries not required in common for all the platforms but necessary to the platform for a target build, an interface reference circuit for performing a dynamically created process, declared for determining which application programming interface to use for the target build, of querying open-source interfaces for libraries remaining as not having been extracted, the remaining libraries being interface difference files, and a manifest file creation circuit for creating manifest files, in which information on querying open-source interfaces is described and being necessary to the application development environment for a build, for any difference files found by the interface reference circuit, and merging the manifest files, created for the interface difference files, with existing manifest files;

a project updating process therein including initiating the application development environment, and operating the development tool circuit and displaying the GUI for starting application creation, via the file extractor, referring to the resources-for-building holding circuit, searching all the project components present in the folders, listing the platform versions of all the projects, confirming the version of the platform for building the project to create the application, determining whether the searched projects have the same platform version as that of the application development environment itself, if the searched projects have the same platform version, terminating the project updating process, and if the searched projects have a different platform version, updating version-dependent files in the application development environment, by replacing any files that are different per version stored in the application development environment with files appropriate to the version of the project, and via the manifest file creation circuit, creating manifest files for the interface difference files, and merging the manifest files created for the interface difference files with the existing manifest files.

2. An application development support system for creating an application comprising:

a development tool circuit for i) providing an application development being an integrated environment for supporting designing, coding, debugging, and testing of applications using a graphical user interface (GUI), and for ii) controlling the application development environment such as to be created in units of projects, the projects including files, libraries, and folders, with components of the projects being stored in the folders, the development tool circuit being used, in creating of applications, for defining a project and editing source code in the defined project;

a resources-for-building holding circuit that includes the files and the libraries required when building an application to be created in a project; and a building circuit using the files and the libraries in the resources-for-building holding circuit to execute a build for creating an application, the build including i) generating of execution codes for the application based on the files in the resources-for-building holding circuit, and ii) processing including compile and link steps, and the building circuit including a building execution circuit for building an application based on the resources-for-building holding circuit, a file extractor for i) extracting the libraries required in common for all platforms including a plurality of versions in an operating system, for ii) arranging the searched libraries required in common for all the platforms into necessary locations for a project, for iii) searching the platform supporting the version of a project, and for iv) identifying libraries not required in common for all the platforms but necessary to the platform for a target build, an interface reference circuit for performing a dynamically created process, declared for determining which application programming interface to use for the target build, of querying open-source interfaces for libraries remaining as not having been extracted, the remaining libraries being interface difference files, and a manifest file creation circuit for creating manifest files, in which information on querying open-source interfaces is described and being necessary to the application development environment for a build, for any difference files found by the interface reference circuit, and merging the manifest files, created for the interface difference files, with existing manifest files; wherein a project updating process by the application development support system includes via a user of the application development support system, initiating the application development environment, and operating the development tool circuit and displaying the GUI for starting application creation, via the file extractor, referring to the resources-for-building holding circuit, searching all the project components present in the folders, listing the platform versions of all the projects, confirming the version of the platform for building the project to create the application, determining whether the searched projects have the same platform version as that of the application development environment itself, if the searched projects have the same platform version, terminating the project updating process, and if the searched projects have a different platform version, updating version-dependent files in the application development environment, by replacing any files that are different per version stored in the application development environment with files appropriate to the version of the project, and via the manifest file creation circuit, creating manifest files for the interface difference files, and merging the manifest files created for the interface difference files with the existing manifest files.

3. A method for creating an application by an application development support system, the application development support system including a development tool circuit for i) providing an application development environment being an integrated environment for supporting designing, coding, debugging, and testing of applications using a graphical user interface (GUI), and for ii) controlling the application development environment such as to be created in units of projects, the projects including files, libraries, and folders, with components of the projects being stored in the folders, the development tool circuit being used, in creating of applications, for defining a project and editing source code in the defined project;

a resources-for-building holding circuit that includes the files and the libraries required when building an application to be created in a project; and a building circuit using the files and the libraries in the resources-for-building holding circuit to execute a build for creating an application, the build including i) generating of execution codes for the application based on the files in the resources-for-building holding circuit, and ii) processing including compile and link steps, and the building circuit including a building execution circuit for building an application based on the resources-for-building holding circuit, a file extractor for i) extracting the libraries required in common for all platforms including a plurality of versions in an operating system, for ii) arranging the searched libraries required in common for all the platforms into necessary locations for a project, for iii) searching the platform supporting the version of a project, and for iv) identifying libraries not required in common for all the platforms but necessary to the platform for a target build, an interface reference circuit for performing a dynamically created process, declared for determining which application programming interface to use for the target build, of querying open-source interfaces for libraries remaining as not having been extracted, the remaining libraries being interface difference files, and a manifest file creation circuit for creating manifest files, in which information on querying open-source interfaces is described and being necessary to the application development environment for a build, for any difference files found by the interface reference circuit, and merging the manifest files, created for the interface difference files, with existing manifest files;

the method comprising:

via a user of the application development support system, initiating the application development environment, and operating the development tool circuit and displaying the GUI for starting application creation;

via the file extractor, referring to the resources-for-building holding circuit, searching all the project components present in the folders, listing the platform versions of all the projects, confirming the version of the platform for building the project to create the application, determining whether the searched projects have the same platform version as that of the application development environment itself, if the searched projects have the same platform version, terminating the project updating process, and if the searched projects have a different platform version, updating version-dependent files in the application development environment, by replacing any files that are different per version stored in the application development environment with files appropriate to the version of the project; and via the manifest file creation circuit, creating manifest files for the interface difference files, and merging the manifest files created for the interface difference files with the existing manifest files.

* * * * *